United States Patent [19]

Hartig

[11] Patent Number: 4,913,899
[45] Date of Patent: Apr. 3, 1990

[54] APPARATUS FOR COOLING STRANDS OF SYNTHETIC MATERIAL

[76] Inventor: Günter Hartig, Lerchenweg 1, 6458 Bodenbach 2, Fed. Rep. of Germany

[21] Appl. No.: 230,619

[22] Filed: Aug. 9, 1988

[30] Foreign Application Priority Data

Aug. 11, 1987 [DE] Fed. Rep. of Germany ....... 3726606

[51] Int. Cl.⁴ ............................................ B29C 47/88
[52] U.S. Cl. ...................................... 425/71; 425/315; 264/237
[58] Field of Search .................. 425/67, 68, 69, 70, 425/71, 72.2, 294, 311, 313, 315, 316; 264/237

[56] References Cited

U.S. PATENT DOCUMENTS

| | | | |
|---|---|---|---|
| 2,619,677 | 12/1952 | Ryan | 425/71 |
| 2,947,029 | 8/1960 | Bakker | 425/72.2 |
| 3,076,999 | 2/1963 | Washburn | 425/316 |
| 3,650,645 | 3/1972 | Yamada et al. | 425/71 |
| 4,025,252 | 5/1977 | Hunke | 425/71 |
| 4,124,341 | 11/1978 | Locker | 425/294 |
| 4,192,635 | 3/1980 | Hunke et al. | 425/71 |
| 4,528,157 | 7/1985 | Lettner et al. | 425/71 |
| 4,530,649 | 7/1985 | Philipp et al. | 425/71 |
| 4,632,752 | 12/1986 | Hunke | 425/71 |

FOREIGN PATENT DOCUMENTS

3145613 6/1984 Fed. Rep. of Germany .
61-148006 7/1986 Japan ................................. 425/71

Primary Examiner—Jay H. Woo
Assistant Examiner—C. Scott Bushey
Attorney, Agent, or Firm—W. G. Fasse; D. H. Kane, Jr.

[57] ABSTRACT

A device for cooling synthetic material strands exiting from an extruder nozzle is used especially in the production of synthetic material granules. The hot strands must be cooled before they can be granulated. The cooling apparatus includes a guide element which is tiltable at its upper end about a horizontal axis arranged near the extruder nozzle. Thus, the guide element continuously receives and guides the synthetic material strands exiting from the extruder nozzle. The guide element may be tilted to a first position to guide scrap material, such as start-up strand material, into a scrap bin or may be tilted into a second position to guide usable strand material onto a further guide member for further processing. The lower end of the guide element carries a cutting arrangement for cutting off the synthetic material strands. The guide element carries a cooling arrangement which at least includes a cooling water pipe with spray nozzles.

5 Claims, 3 Drawing Sheets

APPARATUS FOR COOLING STRANDS OF SYNTHETIC MATERIAL

FIELD OF THE INVENTION

The invention relates to an apparatus for cooling strands of synthetic material exiting from an extruder nozzle. Such an apparatus is used, for example, in the production of synthetic granules such as granules of thermoplastic material.

DESCRIPTION OF THE PRIOR ART

Machines of the above mentioned type include a guide element tiltably supported over a tank or tub for guiding and holding the synthetic material strands. The guide element includes a cutting device for cutting the strands of synthetic material and a cooling system which may, for example, include cooling water pipes with spray nozzles for cooling the extruded strands.

An apparatus of the above described type is, for example, disclosed in German patent publication No. 3,145,613 and in the corresponding U.S. patent publication No. 4,530,649. This known device has a guide element in the shape of a trough or chute and is tiltable about its lower end from a vertical orientation into an angled or slanted orientation in such a manner that the synthetic material strands fall from an extruder nozzle onto the guide element when it is positioned in its slanted orientation. On the other hand, when the guide element is positioned in its vertical orientation the extruded strands fall freely from the extruder nozzle as waste or scrap material without being received by the guide element. In order to prevent the hot, molten, at least partially fluid, synthetic material strands from adhering to the upper end of the guide element while it is being tilted, either the production of the synthetic material strand must be interrupted, or a bar or knife must be provided at the upper end of the guide element to serve as a severing device. Nevertheless, it remains difficult and problematic to exactly sever and then guide the hot synthetic material strands exiting from the extruder nozzle at the beginning of a production run in a manner so that the cross-section of the strands is not altered and so that the strands do not adhere or stick to various areas of the guide element. If such diameter variation and adhering are not prevented, clumps are formed in the strands resulting in rejected scrap material. The beginning of any production run is most difficult and problematic in this context.

U.S. Pat. No. 4,025,252 discloses a granulating apparatus for strands of thermoplastic material including an entrance ramp and a guide chute having cooling water sprays for guiding and cooling usable extruded strands. Waste strands such as non-uniform start-up strands are not directed onto the guide chute to be cooled. Rather, the entrance ramp is opened to allow the hot, molten, extruded strands to fall into a waste material channel. The hot strands may clump or adhere in the waste channel, and similar problems may occur when the hot strands are deflected back onto the guide chute to produce usable cooled strands. Problems are likely to occur when the hot strands pass over the top edge of the guide chute.

U.S. Pat. No. 4,124,341 describes an apparatus for cooling and granulating strands of thermoplastic material. However, means for removing or eliminating waste strands such as start-up strands are not disclosed. An entrance flap could apparently be opened to eliminate waste strands as described above. Similar problems as described above are to be expected.

Another similar apparatus is disclosed in U.S. Pat. No. 4,192,635, and includes two chutes arranged in a mirror-symmetrical back-to-back fashion, with water sprays for cooling extruded thermoplastic strands. Means for eliminating waste strands are not provided.

OBJECTS OF THE INVENTION

In view of the foregoing it is the aim of the invention to achieve the following objects singly or in combination:

to construct an apparatus to be arranged below or downstream of an extruder nozzle for cooling and solidifying extruded synthetic material strands;

to allow a production run to be interrupted in such an apparatus while avoiding clumping and sticking of the new very hot molten synthetic material strands at the beginning of a new production run; and to cool all the strand material exiting from the extruder nozzle so that waste or scrap material, as well as the usable strand material, is cooled so that clumping or sticking of the material is prevented.

SUMMARY OF THE INVENTION

The above objects have been achieved in an apparatus for cooling strands of synthetic material according to the invention, wherein a guide element is journalled at its upper end to be tiltable about a horizontal journal axis arranged close to the extruder nozzle. Thus, the upper end of the guide element is arranged close to the extruder nozzle for constantly receiving the hot molten fluid synthetic material strands in an uninterrupted manner from the extruder nozzle. Cutting means are arranged at the lower end of the guide element for cutting off strands of scrap material such as start-up material. The above mentioned horizontal journal axis permits tilting the guide element between a first position for directing scrap material, such as start-up material, into a scrap tub and a second position for directing usable synthetic strand material onto a further guiding member such as a conveyor belt which may transport the usable strands to a conventional granulating device.

In this just described arrangement the synthetic material strands do not flow from the extruder nozzle either directly into a scrap tub or onto the cooling apparatus as in the prior art, but rather, the synthetic material strands always flow from the extruder nozzle directly onto the cooling apparatus, whereby usable strand material and unusable or scrap material is cooled according to the invention. During the start-up of a production run, if the synthetic material strands exiting from the extruder nozzle have not yet reached the desired shape and quality, then the cooling and guide element is simply tilted into the first position to direct the unusable material into the scrap tank or tub. As soon as the shape, size, uniformity and other quality characteristics of the synthetic material strands reach required standards, the guide element is simply tilted into the second operating position without interrupting the extrusion process. The synthetic material strands glide along the guide element onto a further guiding member such as a conveyor belt which delivers the usable strand material to further cutting means for granulating the strands.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
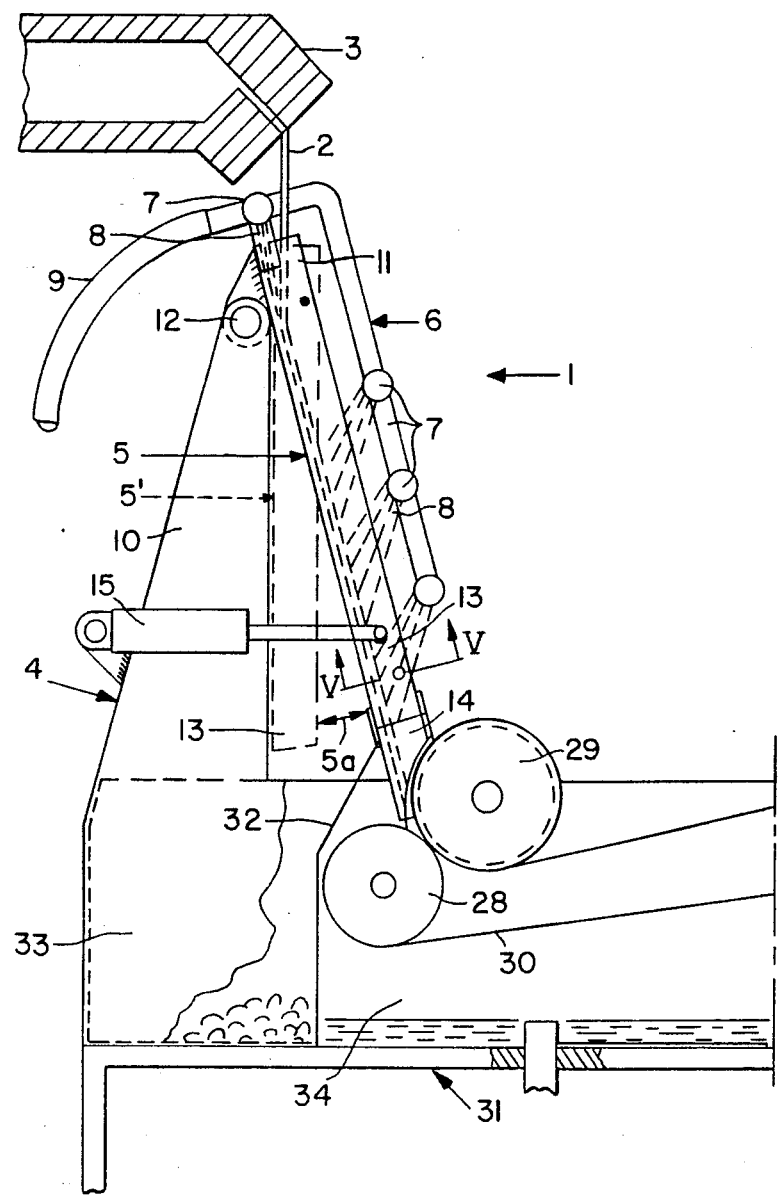
FIG. 1 is a principle side view of the apparatus for cooling synthetic material strands according to the invention.

FIG. 1 shows an extruder nozzle 3 extruding a plurality of synthetic material strands 2 in a row next to one another, whereby the strands 2 fall essentially downwardly into an apparatus 1 for cooling the strands 2 according to the invention. The apparatus 1 essentially includes a machine frame 4 arranged below the extruder nozzle 3. The machine frame 4 carries a strand guide chute or element 5 for guiding the synthetic material strands 2 and a cooling arrangement 6 in the form of at least one cooling water pipe 7 carrying several spray nozzles 8. A water hose 9 supplies cooling water to the cooling water pipes 7. The spray nozzles 8 are oriented to direct a water spray onto the guide element 5 or rather onto the synthetic material strands 2 gliding along the guide element 5.

A stand or post 10 of the machine frame 4 carries a horizontal axis 12 arranged near the extruder nozzle 3. The upper end 11 of the guide element 5 is journalled to the horizontal axis 12. Through this arrangement the invention makes sure that the synthetic material strands 2 which exit from the extruder nozzle 3 always fall onto the upper end 11 of the guide element 5 and are thereby received and guided by the guide element 5 along its entire length independently of the tilting position or orientation of the guide element 5 about the axis 12.

As shown by dotted lines in FIG. 1, the guide element 5 together with the cooling arrangement 6 may be oriented in a vertically hanging first position 5' or may be tilted according to the arrow 5a about the horizontal journal axis 12 into a tilted second position 5 shown in full lines. The tilting according to the arrow 5a may be achieved by means of a piston cylinder unit 15 which is hinged at one end to the guide element 5 and at the other end to the machine frame post 10. When the guide element is oriented in the first vertical position 5' the cooled synthetic material strands 2 are directed into a scrap tank or waste bin 33. When the guide element is instead oriented in the second tilted position 5, then the lower end 13 of the guide element is aligned with a further guide member 14 for guiding the cooled synthetic material strands 2 into a gap between traction rollers 28, 29.

FIG. 1 also shows that the further guide member 14 is rigidly arranged below the lower end 13 of the guide element 5 to assure a continued guiding of the cooled synthetic material strands 2 to traction rollers 28 and 29 which preferably have different diameters. The traction rollers 28 and 29 direct the synthetic material strands 2 onto a further guiding arrangement such as, for example, a conveyor belt 30 which carries the strands to a granulating apparatus which is not shown since it is conventional. The shape and construction of the further guide member 14 is analogous to that of the guide element 5 which will be described in detail below with reference to FIGS. 2 to 5.

As further shown in FIG. 1, at least one tank 31 is arranged below the guide element 5 and the traction rollers 28 and 29. The tank 31 may be separated by a partition wall 32 into a waste bin or scrap tank 33 and a reservoir tank 34 for receiving the cooling liquid. As described above, when the guide element is in the first vertical position 5' cooled scrap strands 2 are directed into the scrap tank 33.

Figure 2:
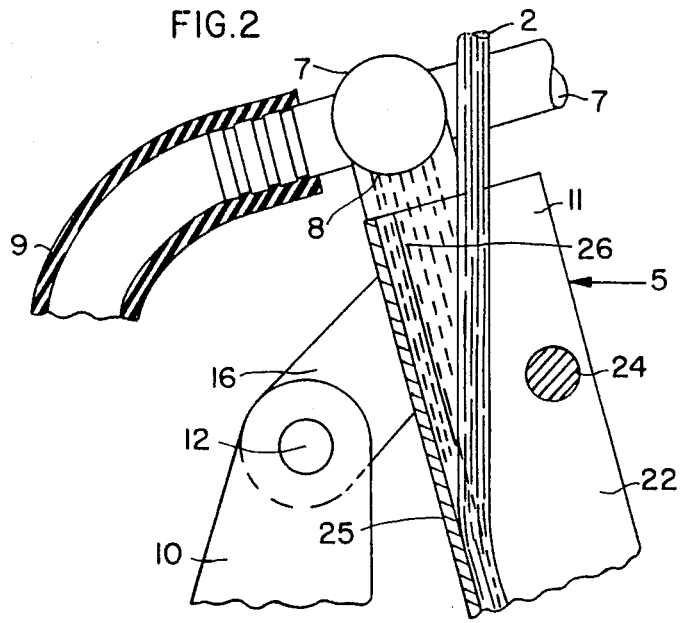
FIG. 2 shows on an enlarged scale a partially sectioned side view of the upper end of the guide element of FIG. 1.
Figure 3:
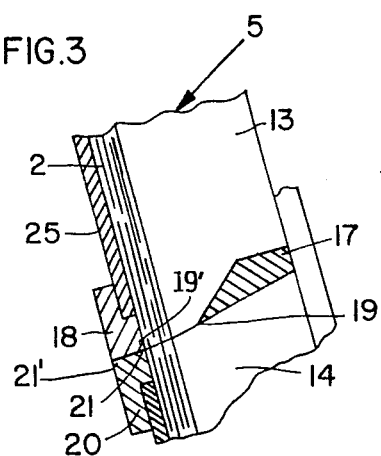
FIG. 3 is a partially sectioned side view of the lower end of the guide element of FIG. 1, shown on an enlarged scale.

FIG. 2 is a detailed view of the upper end 11 of the guide element 5. The upper end 11 is attached laterally to the horizontal journal axis 12 by means of a spacer arm 16. As shown in the detailed view of FIG. 3 the lower end 13 of the guide element 5 includes cutting elements 17 and 18 with cutting edges 19 and 19'. The further guiding member 14 includes a cutting element 20 with two cutting edges 21 and 21' for cutting off the cooled synthetic material strands 2 during the respective tilting of the guide element 5. That is to say, when the guide element is tilted from the vertical waste position 5' to the tilted production position 5, the cutting edge 19' cooperates with the cutting edge 21' to cut off the synthetic material strands 2. In the opposite case when the guide element is tilted from the production position 5 to the vertical waste position 5' the cutting edge 19 cooperates with the cutting edge 21 to cut off the material strands 2.

Figure 4:
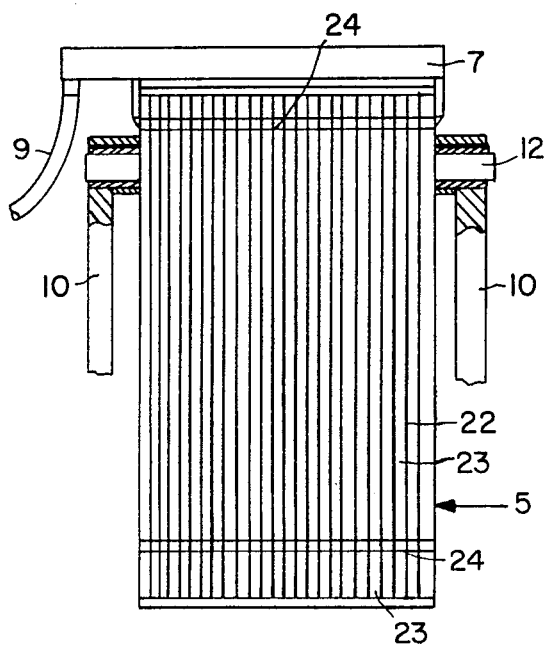
FIG. 4 is a front view of the guide element of FIG. 1.
Figure 5:
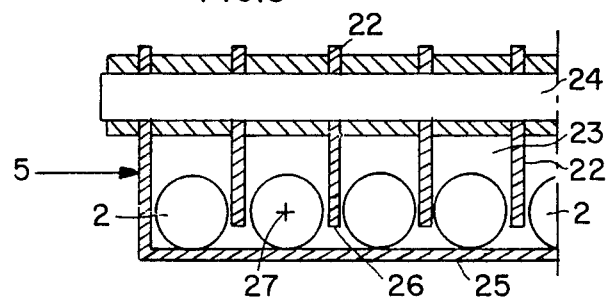
FIG. 5 is a section through the guide element along section line V—V in FIG. 1 also shown on an enlarged scale.

As shown particularly in the cross-section of FIG. 5 and also in the front view of FIG. 4, the guide element 5 preferably has a plurality of troughs or grooves with parallel partition walls 22 forming channels 23 for guiding the separate synthetic material strands 2. The partition walls 22 are arranged on carriers 24 above a floor 25 of the guide element 5, whereby the partition walls 22 end at a spacing above the floor 25 as shown in FIG. 5. The free edges 26 of the partition walls 22 facing the floor 25 are located below the middle 27 of the synthetic material strands 2 so that the partition walls 22 extend from the carriers 24 further than the middle 27 of the synthetic material strands 2. In other words, the opening between neighboring guide channels 23 has a dimension smaller than half the diameter of the material strands to assure proper guiding.

Although the invention has been described with reference to specific example embodiments, it will be appreciated, that it is intended to cover all modifications and equivalents within the scope of the appended claims.

What I claim is:

1. An apparatus for cooling strands of synthetic material exiting from an extruder nozzle, especially for the production of synthetic material granules, comprising a lower strand guide and upper strand guide chute (5) having an upper guide inlet end near said extruder nozzle and an outlet end leading into said lower strand guide for normally guiding said synthetic material strands from said extruder nozzle into said lower strand guide, cooling means (7, 8) arranged for cooling strands travelling on said upper strand guide chute (5) so that usable and unusable strand material is cooled, strand cutting means (19, 19'; 21, 21') arranged directly downstream of said cooling means directly between said outlet end of said upper strand guide chute (5) and an inlet of said lower strand guide for cutting cooled strands, said upper strand guide chute (5) having a sufficient longitudinal extent such that said strands are sufficiently cooled while on said upper strand guide chute (5) so as to prevent clumping or sticking of the material at said strand cutting means, container means for receiving cooled cut scrap material arranged near said outlet end of said upper strand guide chute (5), said lower strand guide being arranged for normally receiving cooled strands from said outlet end, and horizontal axis means arranged at said upper inlet end near said extruder nozzle for journalling said upper strand guide chute (5) at said upper guide inlet end, whereby said upper guide inlet end of said upper strand guide chute is so positioned that it always receives said strands of synthetic material exiting from said extruder nozzle, said upper strand guide chute (5) being tiltable about said axis means into a first position in which said outlet end guides cooled waste strands into said container means, said upper strand guide chute (5) being also tiltable into a second position in which said outlet end guides cooled strands onto said lower strand guide.

2. The apparatus of claim 1, further comprising feed-in traction rollers arranged to receive cooled strands from said lower strand guide, and means for rigidly aligning said lower strand guide with said outlet end of said upper strand guide chute (5) in said second position.

3. The apparatus of claim 1, wherein said upper strand guide chute (5) comprises a floor plate, a plurality of partition walls extending in parallel at a uniform spacing from each other to form a plurality of guide channels along said floor plate for receiving and guiding respective strands, and a free space between said floor plate and respective free edges of said partition walls for an improved coolant flow.

4. The apparatus of claim 3, wherein said free space between said floor plate and said free edges of said partition walls is smaller than the distance from said floor plate to the cross-sectional center of a respective one of said strands.

5. An apparatus for cooling strands of synthetic material exiting from an extruder nozzle, especially for the production of synthetic material granules, comprising a lower strand guide and upper strand guide means having an upper guide inlet end near said extruder nozzle and an outlet end leading into said lower strand guide for normally guiding said synthetic material strands from said extruder nozzle into said lower strand guide, cooling means arranged for cooling strands travelling on said upper strand guide means, strand cutting means arranged below said cooling means at said outlet end of said upper strand guide means for cutting cooled strands only, container means for receiving cooled cut scrap material arranged near said outlet end of said upper strand guide means, said lower strand guide being arranged for normally receiving cooled strands from said outlet end, and horizontal axis means arranged at said upper inlet end near said extruder nozzle for journalling said upper strand guide means at said upper guide inlet end, whereby said upper guide inlet end of said guide means is so positioned that it always receives said strands of synthetic material exiting from said extruder nozzle, said upper guide means being tiltable about said axis means into a first position in which said outlet end guides cooled waste strands into said container means, said upper strand guide means being also tiltable into a second position in which said outlet end guides cooled strands onto said lower strand guide, and wherein said strand cutting means comprises first cutting means effective for cutting cooled strands when said upper strand guide means is tilted from said first position to said second position, and second cutting means effective for cutting cooled strands when said upper strand guide means is tilted from said second position to said first position.

* * * * *